Patented Apr. 29, 1930

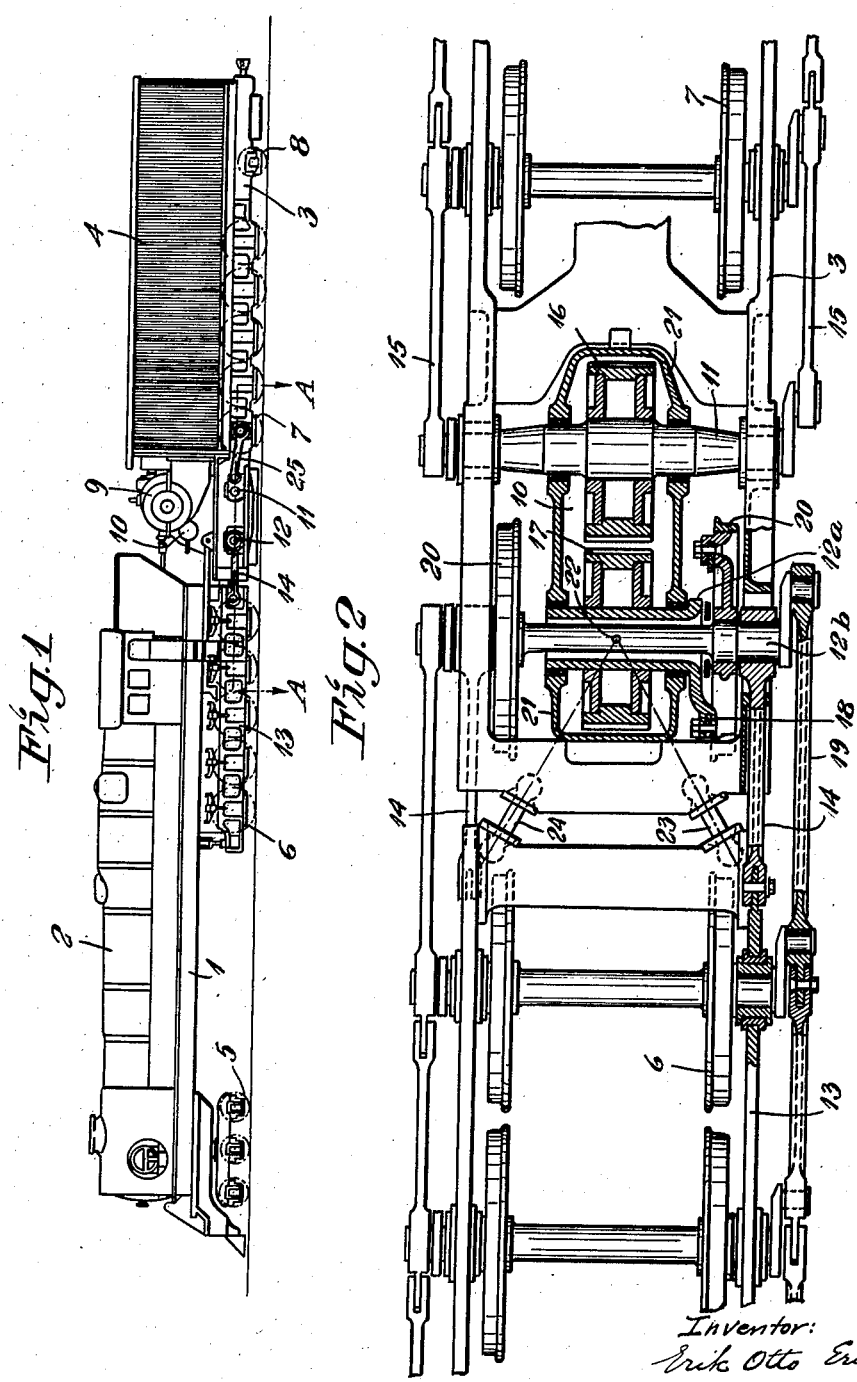

1,756,588

UNITED STATES PATENT OFFICE

ERIK OTTO ERIKSSON, OF LIDINGO, SWEDEN, ASSIGNOR TO AKTIEBOLAGET LJUNG-STROMS ANGTURBIN, OF STOCKHOLM, SWEDEN, A CORPORATION

LOCOMOTIVE CONSISTING OF TWO VEHICLES PROVIDED WITH SEPARATE GROUPS OF WHEELS

Application filed January 20, 1928, Serial No. 248,230, and in Sweden October 27, 1927.

Locomotives are already known, in which the mechanical parts are arranged on two vehicles. In locomotives of this type, difficulties have frequently been met with in arranging the driving wheels in a manner fulfilling all requirements, it being desirable, particularly in very large locomotives, that the major portion of the weight of the locomotive be utilized as adhesive pressure on the driving wheels. As the locomotive consists of two vehicles and only one driving aggregate placed on the one car, it has not been possible, however, to arrange driving wheels on the other vehicle, in order thus to fully utilize the weight of the latter vehicle as adhesive pressure on the driving wheels. It has been necessary, therefore (for instance in electric locomotives), to divide the driving aggregate into a number of units, each unit being disposed into the immediate proximity of the driving wheels adapted to cooperate therewith. Such arrangements increase the cost of manufacture of the locomotive and reduce its efficiency, and for this reason they are hardly applicable to steam-driven locomotives.

Embodiments are also conceivable, where from the point of view of space or for other reasons the driving motor of the locomotive must be disposed on the vehicle having the least weight, this resulting in that the tractive power of this locomotive is limited by the wheel pressures that may be attained with this lighter vehicle.

In turbine driven locomotives of the larger types, difficulties are encountered with respect to space in disposing the turbine machinery and the appertaining toothed gearing on the boiler vehicle of the locomotive, for which reason said parts must be arranged on the other vehicle, that it so say, on the tender pertaining to the locomotive. In case the tender is formed as a condenser for the locomotive, the further requirement is set up in regard to the construction, that the main turbine and thus also the toothed gearing and the condenser shall be arranged on the same vehicle.

But whether the tender has been formed as a condenser or not, it has been desirable to arrange all or some of the driving wheels on the vehicle not carrying the driving machinery, but as this has not been possible hitherto, the possibilities in the design of locomotives, particularly such of the larger types, have been limited.

The present invention refers to locomotives of this kind, consisting of two vehicles with separate groups of wheels, and relates to arrangements, whereby the driving wheels of the locomotive may be arranged independently of the location of the driving machinery.

The invention consists in that the one vehicle contains all or some of the driving wheels of the locomotive, whereas the other vehicle carries the driving machinery of the locomotive, the latter being connected with the said driving wheels of the first-mentioned car through the medium of mechanical motion-transmitting means, while being also guided, wholly or partly, in such a manner as to follow the movement of the driving wheels or of the frame in which the driving wheels are gathered.

Further features characteristic of the invention will be described in connection with the annexed drawings.

Fig. 1 shows (the connecting rod movement being omitted), a lateral view of a turbine-driven locomotive provided with a condenser, said locomotive consisting of two cars with separate groups of wheels. Fig. 2 shows to an enlarged scale a horizontal section of a somewhat modified embodiment on the line A—A in Fig. 1.

In Fig. 1, 1 designates the car carrying the boiler 2 of the locomotive, whereas 3 denotes the car carrying the condenser 4 of the locomotive. The boiler car 1 comprises wheels or groups of wheels 5 and 6, which are separated from the wheels or groups of wheels 7 and 8 of the other vehicle 3. In these groups of wheels, the wheels 6 and 7 are formed as the driving wheels of the locomotive, whereas the wheels or groups of wheels 5 and 8 have not this function but serve substantially as guide wheels for the driving wheels. The wheels 6 are journalled in a frame 13 carrying the boiler car 1 in the form of a bogie.

In this case the driving machinery comprises a steam turbine 9 with a toothed gearing 10 pertaining thereto, said parts being mounted on the condenser car 3. A shaft of the toothed gearing is formed in a manner known per se into a crank or driving shaft 11 connected with the driving wheels 7 by means of cranks and coupling rods not shown in Fig. 1.

According to the invention, the toothed gearing 10 is provided with a further shaft 12 formed into a driving shaft, said shaft being connected by means of a connecting rod movement and coupling rods, not shown in Fig. 1, with the driving wheels 6 mounted on the other car 1. According to the invention, the driving shaft 12 is also guided so as to follow the movement of the driving wheels 6 on the frame 13. This is obtained by the driving shaft 12 being connected with the frame 13 by means of supporting links 14 (compare the Patent No. 1,365,256) in the manner to be described more fully in connection with Fig. 2, while the frame 13 is at the same time connected with the car 3 by means of a so-called ideal coupling (compare the Patent No. 1,461,278), so that the frame 13 may rotate with respect to the car 3 about a point in the toothed gearing 10 which, preferably, is situated in the center of the shaft 12.

Fig. 2, which differs from Fig. 1 substantially in that driving wheels are also provided on the shaft corresponding to shaft 12 in Fig. 1, shows the front portion of the frame of the car 3 carrying the driving machinery and the frame 13 of the bogie. The driving wheels 7 of the car 3 are connected, by means of connecting rods 15, with the slowest running shaft 11 of the toothed gearing 10. In this case said shaft 11 carries a toothed wheel 16 directly, said wheel cooperating with a pinion not shown in the drawing, which pinion is in mesh with the toothed wheel 17 mounted on the hollow shaft $12^a$. This shaft surrounds the shaft $12^b$ with a certain play and transmits the motion to the shaft $12^b$ in any suitable manner, for instance by known pendulum or link arrangements 18 (compare the Patents Nos. 1,596,697 and 1,632,707), the motion being transmitted from shaft $12^b$ onto the driving wheels 6 by means of the connecting rods 19.

In distinction from the embodiment shown in Fig. 1, shaft $12^b$ is provided with driving wheels 20. According to principles already known, the pendulum coupling 18 facilitates movement between the shaft $12^b$, which is resilient with respect to the frame of the car 3, and the hollow shaft $12^a$ journalled in the gear casing 21. The movement of the shaft $12^b$ within the shaft $12^a$ is axial as well as spherical about the center 22 of the shaft. The frame 13 is connected to the frame of the car 3 by means of two pendulums 23 and 24, in such a manner that the frame 13 is caused to turn in relation to the frame of the car 3 about a point within the gear casing 21, preferably about the point 22. If the frame 13 is turned relatively to the frame of the car 3, the links 14 will displace or turn shaft $12^b$ about the point 22, which is facilitated by the previously described pendulum coupling 18. Thus, this pendulum coupling facilitates, first, the resiliency of the springs of car 3 and, second, the movement of the shaft $12^b$ caused by irregularities in the rails, and, finally, also facilitates the movement of the frame 13 with respect to the car 3.

If according to Fig. 1, the shaft $12^b$ is not provided with driving wheels 20, substantially the same arrangements are made use of. Again, if the shaft 11 is provided with driving wheels, similar arrangements are provided at the shaft 11 as those described hereinbefore in connection with shaft 12.

In Fig. 1, shaft 11 has been shown as situated at a somewhat higher level than the shafts on which the driving wheels 7 are arranged, inasmuch as the driving wheels 7 are comparatively small and the toothed wheels 16 mounted on the shaft 11 must be relatively large. Shaft 11 is then connected through a link 25 with the frame of the car 3. If the car 3 springs downwards, the pendulum 25 ensures the proper distance between shaft 11 and the driving wheel axles. Thus the shaft 11 must, in this case too, be arranged movable with respect to the remaining parts of the toothed gearing.

Thus, Figs. 1 and 2 show an embodiment of the invention, where the two cars contain separate groups of driving wheels. It may be conceived, however, particularly in turbine-driven locomotives without a condenser, i. e. where the car 3 has the form of a tender of normal size, that the steam turbine 9 and the toothed gearing 10 pertaining thereto must nevertheless be arranged on the car 3 from the point of view of space. In this case, if a great tractive power is desired in the locomotive, the driving wheels must be arranged on the boiler car. In such an embodiment, driving wheels will thus be present only on the boiler car, while at the same time the tender carries the machinery and the movement is transmitted between the same and the driving wheels, according to the invention.

The statements hereinbefore only involve embodiments in turbine-driven locomotives, particularly such where the tender of the locomotive has been formed into a condenser. The invention may, however, be applied to locomotives of any type comprising two cars, for example to such locomotives where the driving aggregate consists of an electric motor with gearings. The electric aggregate need not then be arranged on the same car as the driving wheels, it being possible to drive a number of groups of wheels arranged in different frames, from a common motor.

Moreover, it should be observed that in the embodiments shown only the last shaft of the gearing is shown as being movable with the driving wheels; it is obvious, however, that a greater portion, or even the whole driving machinery, may be movable in this manner.

What I claim is:—

1. In a locomotive, a plurality of vehicles, driving machinery on one vehicle, driving wheels on another vehicle, motion transmitting mechanism operatively and flexibly connecting said driving machinery with said driving wheels, and means for guiding said mechanism to follow movement of said driving wheels.

2. In a locomotive, a plurality of vehicles, driving machinery on one vehicle, driving wheels on another vehicle, a wheel frame for said driving wheels, motion transmitting mechanism operatively and flexibly connecting said driving machinery with said driving wheels, and means for guiding said mechanism to follow movement of said wheel frame.

3. In a locomotive, two vehicles, driving machinery mounted on one vehicle comprising a driving motor, toothed gearing connected thereto, and a crank shaft connected to said gearing, driving wheels mounted on the other vehicle, a wheel frame therefor, connecting rod mechanism operatively connecting said crank shaft and said driving wheels, supporting links connecting said crank shaft with said wheel frame, and coupling means connecting said wheel frame with the first vehicle, whereby the wheel frame may turn with respect to the first vehicle.

4. In a locomotive, two vehicles, driving machinery mounted on one vehicle comprising a driving motor, toothed gearing connected thereto, and a crank shaft connected to said gearing, driving wheels mounted on the other vehicle, a wheel frame therefor, connecting rod mechanism operatively connecting said crank shaft and said driving wheels, supporting links connecting said crank shaft with said wheel frame, and coupling means connecting said wheel frame with the first vehicle, whereby the wheel frame may turn with respect to the first vehicle about a center of rotation positioned within the toothed gearing.

5. In a locomotive, two vehicles, driving machinery on one vehicle including two drive shafts, driving wheels on each vehicle, mechanism operatively connecting one drive shaft to the driving wheels of one vehicle, and mechanism operatively connecting the other drive shaft to the driving wheels of the other vehicle.

6. In a locomotive, two vehicles, driving mechanism on one vehicle including a hollow shaft, a drive shaft within said hollow shaft, and means operatively connecting said hollow shaft and said drive shaft, driving wheels on said other vehicle, a wheel frame therefor, and connecting links between said drive shaft and said wheel frame.

7. In a locomotive, two vehicles, a boiler on one vehicle a condenser on the second vehicle, driving machinery on the second vehicle, driving wheels on each vehicle, and motion transmitting mechanism operatively connecting said driving machinery with the driving wheels of both vehicles.

8. In a locomotive, two vehicles, driving machinery on one vehicle, driving wheels on each vehicle, motion transmitting machinery operatively connecting said driving mechanism with the driving wheels of the driving machinery vehicle, motion transmitting mechanism operatively and flexibly connecting said driving machinery with the driving wheels of the other vehicle, and means for guiding said second mechanism to follow movement of the driving wheels on said other vehicle.

9. In a locomotive, two vehicles, driving machinery on one vehicle, driving wheels on each vehicle, wheel frames for the driving wheels of each vehicle, motion transmitting mechanism operatively connecting said driving machinery with the driving wheels of the driving machinery vehicle, motion transmitting mechanism operatively and flexibly connecting said driving machinery with the driving wheels of the other vehicle, and means for guiding said second mechanism to follow movement of the wheel frame on said other vehicle.

10. In a locomotive, two vehicles, driving machinery on one vehicle, driving wheels on the second vehicle, motion transmitting mechanism comprising relatively displaceable members, and operatively connecting said driving machinery with said driving wheels, and means for relatively displacing said members in correspondence with movement of said driving wheels.

11. In a locomotive, two vehicles, driving machinery on one vehicle, driving wheels on the second vehicle, a wheel frame for said driving wheels, motion transmitting mechanism comprising relatively displaceable members, and operatively connecting said driving machinery with said driving wheels, and means for relatively displacing said members in correspondence with movement of said wheel frame.

12. In a locomotive, two vehicles, driving machinery on one vehicle, driving wheels on each vehicle, motion transmitting mechanism operatively connecting said driving machinery with the driving wheels of the driving machinery vehicle, motion transmitting mechanism comprising relatively displaceable members and operatively connecting said driving machinery with the driving wheels of the other vehicle, and means for relatively displacing said members in correspondence with movement of said driving wheels.

13. In a locomotive, two vehicles, driving machinery on one vehicle, driving wheels on each vehicle, wheel frames for the driving wheels of each vehicle, motion transmitting mechanism operatively connecting said driving machinery with the driving wheels of the driving machinery vehicle, motion transmitting mechanism comprising relatively displaceable members and operatively connecting said driving machinery with the driving wheels of the other vehicle, and means for relatively displacing said members in correspondence with movement of the wheel frame of said other vehicle.

In testimony whereof I affix my signature.

ERIK OTTO ERIKSSON.